United States Patent [19]

Umbaugh

[11] 3,855,693

[45] Dec. 24, 1974

[54] METHOD FOR ASSEMBLING MICROELECTRONIC APPARATUS

[75] Inventor: Charles Wayne Umbaugh, Phoenix, Ariz.

[73] Assignee: Honeywell Information Systems, Inc., Waltham, Mass.

[22] Filed: Apr. 18, 1973

[21] Appl. No.: 352,148

[52] U.S. Cl. .......................... 29/626, 29/589, 72/56, 219/85, 317/101 CC

[51] Int. Cl. .......................... H05k 3/32

[58] Field of Search .............. 219/85; 228/4, 14, 49; 29/626, 497.5, 502, 577, 589, 622; 72/56; 317/101 A, 101 CC

[56] References Cited

UNITED STATES PATENTS

| | | | |
|---|---|---|---|
| 3,308,526 | 3/1967 | Jellig | 72/56 X |
| 3,520,055 | 7/1970 | Jannett | 29/626 X |
| 3,612,955 | 10/1971 | Butherus | 29/589 |

*Primary Examiner*—Richard J. Herbst
*Assistant Examiner*—Joseph A. Walkowski
*Attorney, Agent, or Firm*—Edward A. Gerlaugh; Walter W. Nielsen; Edward W. Hughes

[57] ABSTRACT

A microelectronic device mounted face up on a substrate has leads of ferromagnetic material extending outwardly in cantilevered fashion from the device over circuits on the substrate. The leads, forced toward the surface of the substrate by a magnetic field, are bonded to the substrate circuits.

12 Claims, 12 Drawing Figures

METHOD FOR ASSEMBLING MICROELECTRONIC APPARATUS

BACKGROUND OF THE INVENTION

The invention relates to the fabrication and assembly of microelectronic devices and, more particularly, to the joining of integrated circuits mounted face up on a substrate to electrical conductors on the substrate.

One of the most common elements used for manufacturing modern electronic systems is the hybrid interconnect circuit (HIC). The HIC is generally a microminiature assembly of circuit elements comprising a planar substrate having electrical conductors formed thereon, and a number of passive and active components interconnected by the conductors. Active components include devices such as semiconductor integrated circuits; passive components include devices such as resistors and capacitors formed by deposition on the substrate as well as separately formed discrete and monolithic devices.

HIC assemblies currently produced in the industry include those having integrated circuit components affixed to a surface of a substrate, with the lands or pads of the circuits connected to conductive runs formed on the surface of the substrate. One prior art method for electrically connecting a device to the substrate first affixes the back side of the device to the substrate, and then makes the necessary pad to substrate conductor connections by flying-wire bonds. The technique of thermocompression or ultrasonic bonding of individual wires has been successful in achieving a reduction of size and weight of microelectronic structures, but with attendant problems and disadvantages, e.g., each wire must be accurately positioned and aligned before the bond is made. After bonding, wire sag may cause shorting of the wires to each other or to other components of the structure. Because of the complexity of the individual, cumulative tasks involved, and the complexity of the production equipment used to perform the tasks, the skill level of the assemblers must be high. Furthermore, the cumulative-step technique offers no ability to functionally test the assembly until essentially all the connections are made.

An alternate prior art method for electrically connecting devices to the substrate is the well known flip-chip technique. The technique involves the formation of pillars or bumps on the active face of the chip and/or the substrate conductors, the subsequent face-down placement of the chip on the substrate so that the pillars and conductors are aligned, and then electrically connecting the pillars and connectors by a bonding process. When devices are attached face down, the only path for thermal conduction from the device to the substrate is through the bonded connections.

Still another prior art method of device joining utilizes devices having beam leads. Beam leads are generally defined in the industry as metallization projecting from a microelectronic device for connecting the circuit elements on the active face of the device to metallized circuit patterns on the substrate by a bonding process. Further, beam leads are generally rigid, self-supporting projections built up on the active face of the device, therefore, beam-leaded chips are joined to the substrate with the active face down, supported above the substrate by the rigid beam leads. Heat dissipation from a mounted beam-leaded chip is similar to that of the flip-chip device, i.e., both are junction isolated devices and heat must flow through the bonded leads.

In order to realize the advantages inherent in both the prior art face-up and face-down mounting techniques (i.e., superior thermal conductivity through the base of the affixed chip in the former; multi-lead attachment of cantilevered leads in the latter), without accruing the attendant disadvantages, devices having flexible cantilevered leads may be affixed face-up to the substrate and the leads subsequently bonded to the substrate circuits. Since the leads attached to the device lie in a plane which is generally parallel with but separated from the plane of the substrate circuits due to the thickness of the device, means must be provided for forcing the cantilevered leads toward the substrate to meet the circuits on the surface thereof before bonding can be effected. Prior art methods for bringing the cantilevered leads into contact with the substrate circuits include mechanical forming or bending of the leads, either before (preforming) or after (postforming) the leads are attached to the chip. Another technique utilizes a lead-forming tool shaped so as to contact the cantilevered end of each of the leads and simultaneously force all of the lead ends toward the substrate circuits. Such operations are generally performed on a single device at a time, utilizing precision electrical/mechanical/optical systems in order to assure proper positioning of the tool with respect to the device. The precision systems are costly, and often limit production due to the single-device processing capability characteristic of the operator controlled equipment.

SUMMARY OF THE INVENTION

Accordingly, it is a primary object of my invention to provide an improved method for assembling microelectronic apparatus.

It is a more particular object of my invention to reduce the number of operator-dependent steps required for assembling micro-electronic apparatus, and correlatively, to reduce the complexity and cost of the assembly equipment.

It is further an object of the invention to provide a method of electrically connecting a plurality of components such as integrated circuits to a substrate in a single operation.

It is another object of the invention to provide an improved method for deflecting the extended end of a cantilevered lead attached to a circuit device toward the substrate to which the device is attached. Further, it is desirable to provide a method for simultaneously flexing a plurality of cantilevered leads attached to a plurality of circuit devices toward a substrate to which the devices are affixed, in order to simultaneously bond all of the terminal ends of the cantilevered leads to circuit runs on the substrate.

In accordance with one aspect of my invention, an elongated flexible lead is formed of ferromagnetic material and attached at one end, in cantilevered fashion, to a circuit device. The leaded device is affixed to a substrate and the assembly placed in a strong uniform magnetic field generally orthogonal with the plane of the lead. The cantilevered end of the lead is thereby deflected magnetically toward the substrate to contact a circuit on the substrate with which it was aligned. The lead is affixed to the substrate circuit by a bonding process.

BRIEF DESCRIPTION OF THE DRAWINGS

The invention is pointed out with particularity in the appended claims, however, other objects and features will become more apparent and the invention itself will best be understood by referring to the following description and embodiments taken in conjunction with the accompanying drawings, in which:

DESCRIPTION OF THE PREFERRED EMBODIMENT

Figure 1:
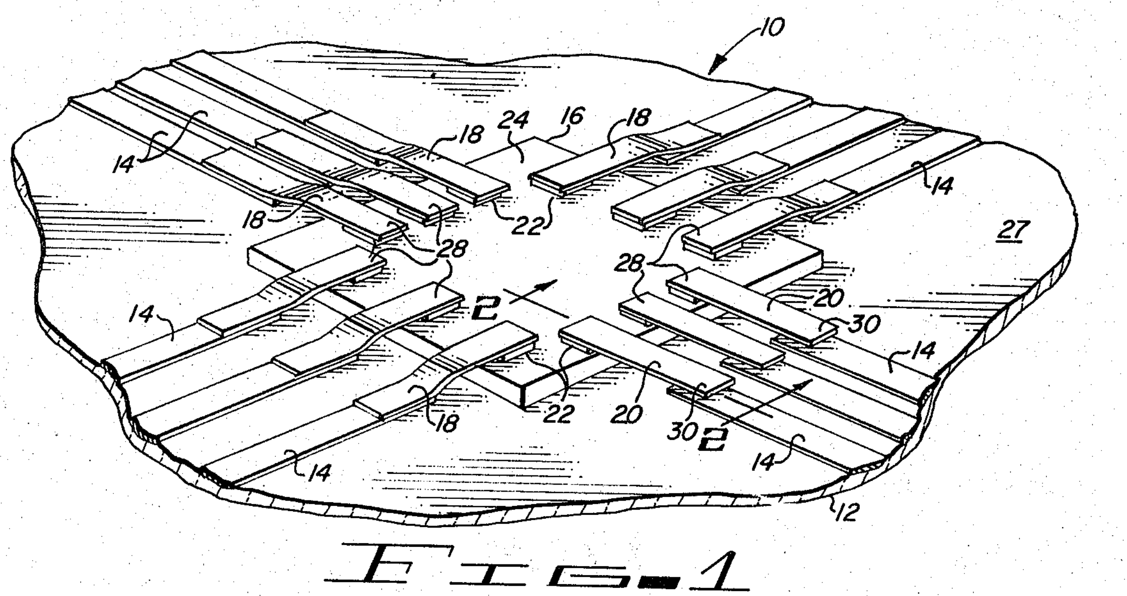
FIG. 1 is a fragmentary perspective view of a microelectronic assembly.

FIG. 1 shows a microelectronic assembly 10 comprising a planiform insulator or substrate 12 having thereon a plurality of circuit elements including a pattern of electrically conductive circuit runs 14. The substrate 12 may be of any material, rigid or flexible, suitable for supporting an array of interconnecting runs 14 and other circuit elements and devices attached thereto. The substrate 12 may be, for example, alumina, beryllia, glass, epoxy-glass, or the like, and may be a single or multilayer structure. The conductive runs 14 may be of any suitable material, for example, copper or gold. An integrated circuit element or chip 16 is shown attached to the substrate 12. The chip 16 may be attached to the substrate 12 in accordance with a process described in my copending application, Ser. No. 320,233, entitled, "Method For Precisely Aligning Circuit Devices Coarsely Positioned on a Substrate," the disclosure in which application is incorporated herein by reference. Generally, only a single surface 27 of the planiform substrate 12 is utilized for mounting components such as the chip 16, the other side (not shown) being reserved for attachment to a heat sink or a voltage or ground plane. The surface 27 to which components are affixed is herein termed the active surface 27 of the substrate. My invention is applicable as well to structures having substrates with components mounted on both sides thereof.

A plurality of flexible cantilevered leads 18, 20 are each affixed at inner ends 28 thereof to a conductive land or pad 22 formed on an active face 24 of the chip 16. The pads 22 are, in turn, connected to integrated circuit devices (not shown) formed in the active face 24 of the chip 16. The active face 24 is defined herein as the face or surface of a component such as the chip 16 in which active circuit devices are formed, e.g., semiconductor integrated circuits formed in a body of semiconductor material. The chip 16 of FIG. 1 is affixed to the substrate 12 in an active-face up, or simply, face up configuration. The leads 18, 20 thus serve to electrically connect the integrated circuit devices of the chip 16 to the conductive runs 14 of the substrate, when the outer or cantilevered ends of the leads 18, 20 are bonded to the runs 14.

Terms utilized herein and associated with the attachment of leads to the circuit elements of a microelectronic assembly are "inner-lead bond" and "outer-lead bond." Inner-lead bond refers to affixing, usually in a single operation, the inner ends 28 of leads, e.g., leads 18, 20 of FIG. 1 to the lands 22 of the chip 16. The leads 18, 20 may be attached to the pads 22 in accordance with a tape automated bonding (TAB) process described in my copending application Ser. No. 232,029, assigned to the same assignee as the present invention. Outer-lead bond refers to affixing, usually in a single operation, the outer or cantilevered ends of the leads 18, 20 to the corresponding conductive runs 14 on the substrate 12. The present invention concerns outer-lead bonding. The assembly of FIG. 1 is exemplary in nature, showing leads 18 connected to corresponding circuit elements 14 on the surface of the substrate 12 as by an outer-lead bonding operation. The position of the leads prior to their connection to the substrate circuits is as illustrated with respect to the pair of leads 20, viz., the leads 20 are extended outward in cantilevered fashion from the chip 16, and are generally parallel with the active face 24 of the chip and the surface 27 of the substrate 12. It is understood that the drawings are not to scale and the dimensions of the various elements shown in the drawings are exaggerated in order to clarify the explanation and, therefore, the understanding of my invention.

Figure 2:
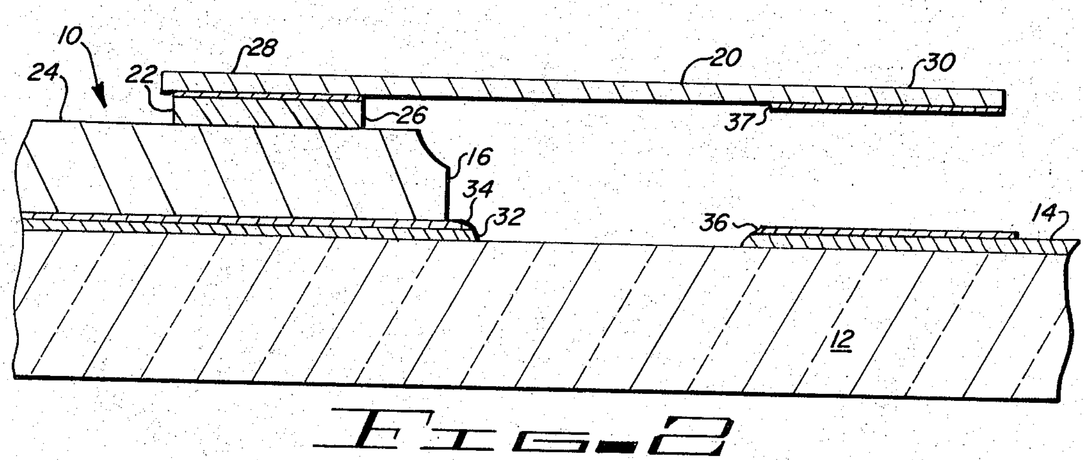
FIG. 2 is a section view taken along lines 2—2 of FIG. 1.

FIG. 2, a section view taken along lines 2—2 of FIG. 1, shows the cantilevered lead 20 attached to the corresponding land 22 of the chip 16 by a bonding medium 26 such as solder. The bonding medium 26 may be a reflowable metal selectively applied to the pad 22, to the inner end 28 of the lead 20, or to both the pad 22 and the lead end 28. Alternatively, the inner-lead bond may be accomplished by thermocompression or ultrasonic bonding, in which case the bonding medium 26 comprises a fused region of the materials which form the lead 20 and the pad 22. FIG. 2 is representative of a plurality of components such as the chip 16 affixed to a die-bonding pad 32. Bonding media 34 such as Au-Sn, Au-Ge or Pb-In alloys, or other solders may be utilized to align and attach the chip 16 to the pad 32 in accordance with the aforementioned copending application Ser. No. 320,233. The outer-lead bond region of the circuit run 14 is tinned or coated with a layer 36 of reflowable metal having a melting temperature less than the melting temperature of the bonding medium 26. The end 30 of the cantilevered lead 20 may be coated with a flux 37 to promote an outer-lead bond by solder reflow. The chip-to-substrate bonding medium 34 and the outer-lead bonding medium 36 may have melting and solidification temperatures which are the same or which lie in the same bonding temperature range. However, it is preferable that the outer-lead bonding medium 36 have a lower melting temperature than the other medium 34 so that the chip 16 remains firmly affixed to the substrate during the outer-lead bonding operation.

Figure 3:
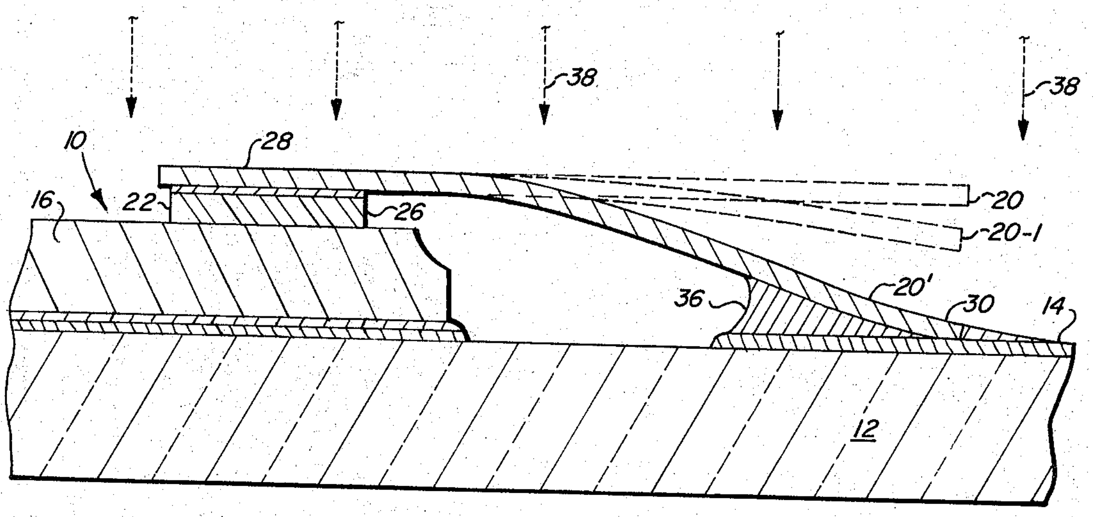
FIG. 3 is a diagrammatic section view of a lead connected to a substrate in accordance with the invention.
Figure 4:
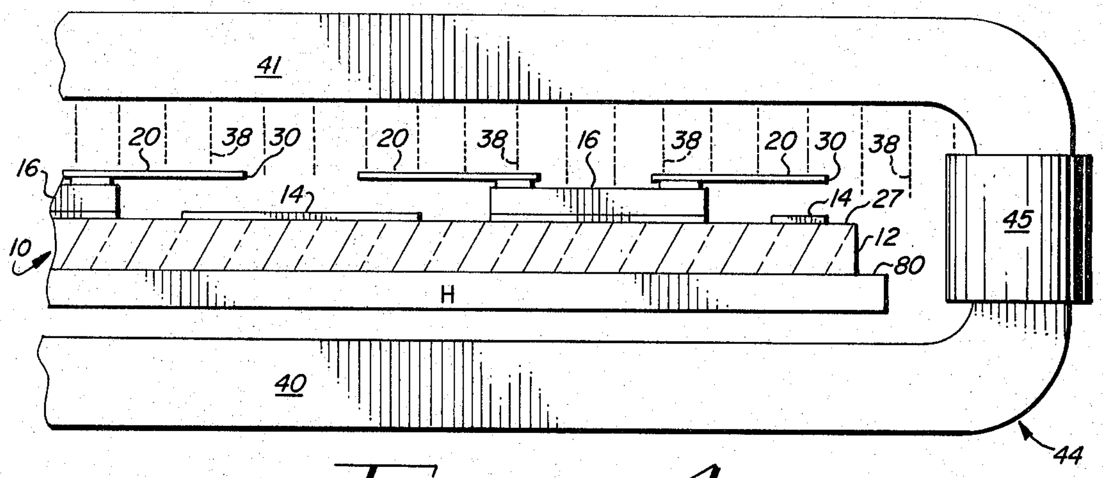
FIG. 4 is a diagrammatic representation of a microelectronic assembly placed in the field of an electromagnet.

Referring tp FIGS. 3 and 4, the leads 20 are shown as positioned after chip 16 alignment with the substrate 12 and prior to outer-lead bonding. The leads 20 extend outwardly in cantilevered fashion from the chip 16, are generally parallel with the surface 27 of the substrate 12 and are separated from the surface 27 by the thickness of the chip 16. In order to provide a means for flexing the leads 20 toward the substrate 12 to effect mechanical contact between the cantilevered ends 30 of the leads 20 and the circuit runs 14, the leads 20 are fabricated from ferromagnetic material. Ferromagnetic material is defined herein generally as a class of metals or alloys having relative permeabilities noticeably exceeding unity, in practice, from 1.1 to $10^6$. Such materials generally exhibit a definite saturation point and appreciable residual magnetism and hysteresis. "Hard" magnetic materials have very pronounced hysteresis with large remanance and large coercive force. In "soft" magnetic materials hysteresis is not very pronounced and the remanance and coercive force are small.

Referring still to FIGS. 3 and 4, the asssembly 10 having leads 20 of ferromagnetic material is placed between the poles 40, 41 of an electromagnet 44. The poles 40, 41 are arranged so as to produce a magnetic field having lines of flux generally orthogonal to the plane of the substrate 12 and leads 20. When the exciting coil 45 of the electromagnet 44 is energized, the magnetic field, represented by the dash lines 38, forms a magnetic circuit passing through the ferromagnetic material of the cantilevered leads 20. Consequently, refer now to FIG. 3, the horizontally disposed lead 20 is deflected toward the circuit run 14 of the substrate 12, as shown by the lead 20-1 in dashed lines. In a properly oriented magnetic field 38 of sufficient strength the lead 20 is deflected until mechanical contact is established between the end 30 of the lead (as in the position) 20' and the circuit run 14.

Noting FIG. 3, it is apparent that a configuration wherein a magnetic field exactly orthogonal with a perfectly planar lead having no magnetic history will exhibit magnetic equilibrium. In such equilibrium, the lines of flux would pass through the lead 20, leaving the lead unmoved. No such theoretical configuration exists, however, and the magnetic unbalance inherent in the actual device causes the lead 20 to be deflected in the direction of the unbalance. Factors contributing to an unbalanced magnetic condition include the magnetic history of the lead 20, either natural or induced, and the physical state or position of the cantilevered lead as determined by the mechanical properties of the metal in relation to the size of the lead. For example, even though the lead 20 may be formed of so-called magnetically soft metal, enough remanance or magnetic history may be exhibited by the lead to favorably influence the direction in which the lead is deflected in the field of the magnetic circuit. Further, the actual position of the cantilevered lead 20 is slightly declined or sagged due to gravity (assuming gravitational force normal to the plane of the lead), the amount of sag determined by the geometry of the lead and the modulus of elasticity of the metal or alloy utilized to form the lead. In order to insure that the leads are deflected in the desired direction, the metal or alloy used to fabricate the leads 20 may be a relatively hard ferromagnetic material, i.e., one suitable for permanent magnetization imparted during a separate processing step described hereinafter.

Figure 5:
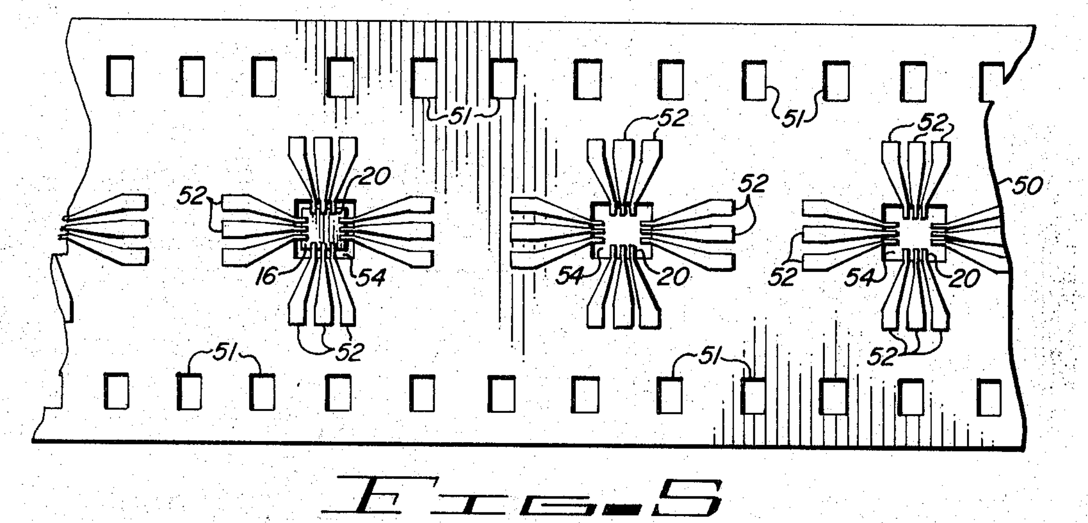
FIG. 5 is a plan view of an elongated carrier utilized for forming leads and assembling microelectronic components.

FIG. 5 depicts a portion of an elongated, flexible film or carrier 50 having a series of apertures 51 along the margins thereof for indexing, and transporting the carrier during the various processing steps. A pattern of metal fingers 52 is formed on a surface of the carrier 50, as by etching from a strip of thin metal foil laminated to the carrier 50. A more detailed description of the process for forming the fingers 52 may be found in the aforementioned co-pending application Ser. No. 232,029. The ends 20 of the metal fingers 52 which subsequently form the cantilevered leads extend from the surface of the carrier 50 over an aperture 54 formed in the carrier. The leads 20 are patterned to coincide with the geometry of a particular component or chip so that the leads 20 may be inner-lead bonded simultaneously to the lands of the chip when the chip is correctly positioned within the periphery of the aperture 54, as shown in the left-hand portion of FIG. 5. The fingers 52 are then severed along the periphery of the aperture 54 to separate the leads 20 and the chip 16 attached thereto from the carrier 50.

The leads 20 are etched from a malleable ferromagnetic metal or alloy formed into a thin foil as required for laminating to the carrier 50. Permanent magnet alloys suitable for use in the present invention, include the Vicalloy types, based on the iron-cobalt-vanadium system, and the Cunico and Cunife types, based on the copper-nickel-cobalt/iron system. Vicalloy is advantageous in that it is magnetically isotropic; Cunife tends to be anisotropic, being more easily magnetized in the direction of rolling. Cunife, on the other hand, has a lower resistivity and is more flexible than Vicalloy, and may be selectively rolled to inhibit magnetic anisotropy.

Figure 6:
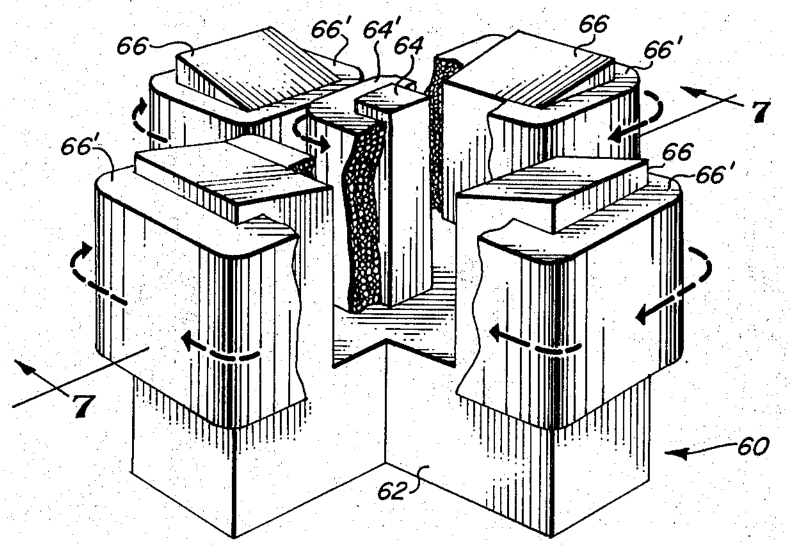
FIG. 6 is a cutaway perspective view of an electromagnet utilized for magnetizing lead frames.
Figure 9:
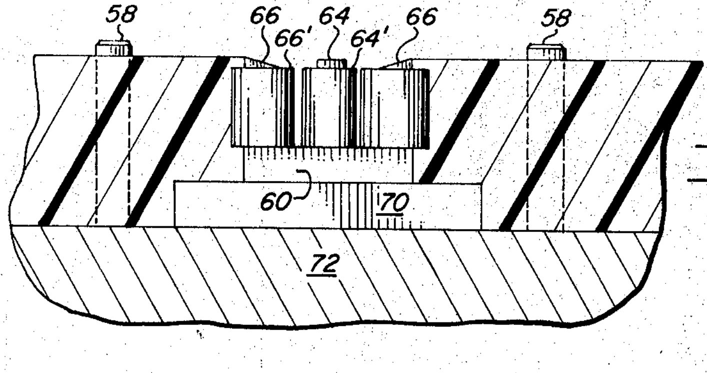
FIG. 9 is a view of the magnetizing assembly taken along line 9—9 of FIG. 8.

FIGS. 6–9 illustrate a magnetizing assembly utilized in conjunction with the carrier of FIG. 5 to permanently magnetize leads 20 formed of hard ferromagnetic material. The indexing apertures 51 (see FIG. 8) of the carrier 50 are aligned with alignment pins 58 of the magnetizing assembly to register the leads 20 with a magnetizing source 60. The ends 28 of the leads 20 (see FIG. 7) are aligned over a central member 64 of the magnetizing source 60. The magnetizing source 60, shown in greater detail in FIG. 6, is an electromagnet comprising a base 62, the central member 64 and one or more peripheral posts 66, the embodiment shown having four posts 66. The posts 66 are shaped to conform with the lead geometry of a particular chip. Corresponding DC exciting coils 64', 66', are wound in a direction (shown by the dashed arrows in FIG. 6 and the directional symbols in FIG. 7) which produces a magnetic circuit for inducing permanent magnetization in the leads 20. Referring now to FIG. 9, the magnetizing assembly comprises the magnetizing source 60 mounted on a thermoelectric module 70 which serves to conduct heat generated in the driven electromagnet 60 to a heat sink 72.

Figure 7:
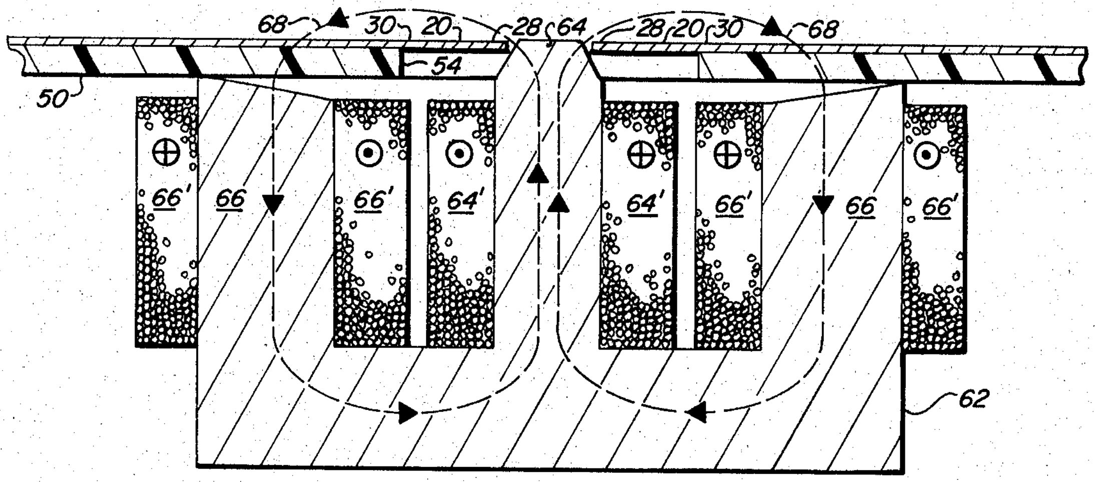
FIG. 7 is a section view of the lead magnetizing source taken along line 7—7 of FIG. 6, showing the carrier aligned therewith.
Figure 8:
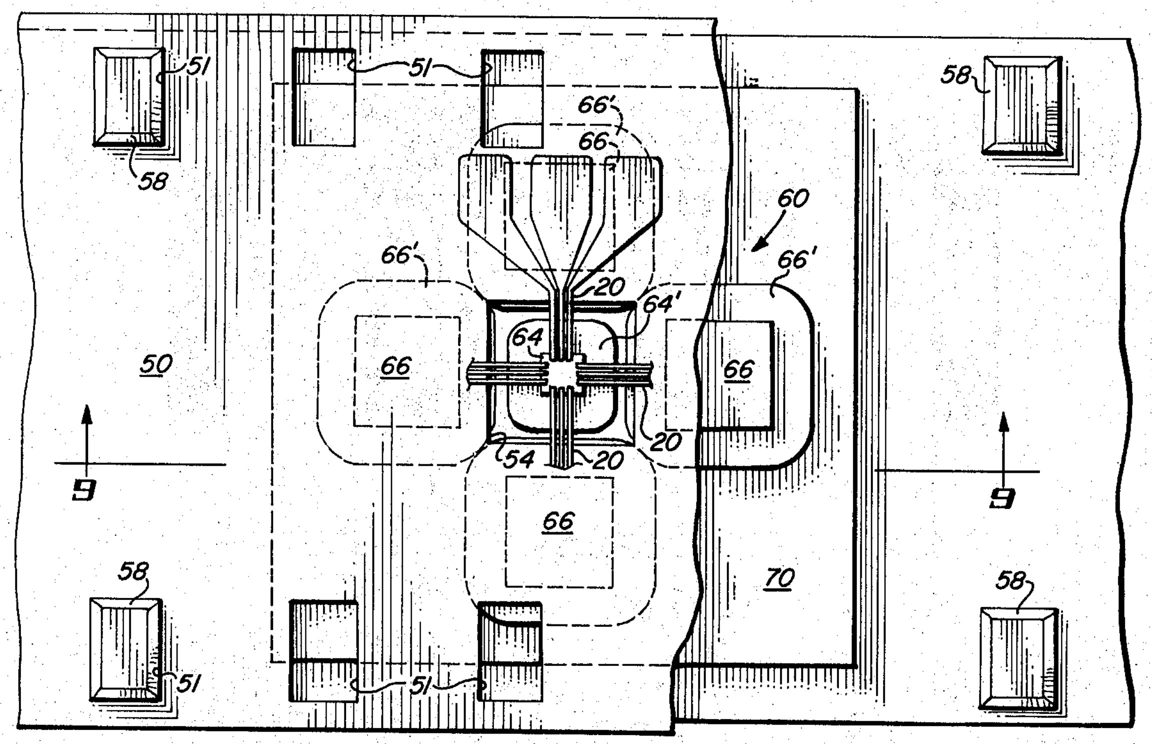
FIG. 8 is a plan view of the leads aligned with the magnetizing assembly.

Referring to FIG. 7, the electromagnet 60 produces a magnetic circuit, represented by the dashed lines 68, which traverses the base 62, the central member 64, the leads 20, and the posts 66, thus magnetizing the leads 20 in the direction illustrated. The magnetism imparted to the leads 20 is oriented such that the inner ends 28 all exhibit a magnetization $-|Q_m|$, and correspondingly, the cantilevered or outer ends 30 exhibit a magnetization $+|Q_m|$. The leads 20 may be magnetized either prior to or after attachment to the chip by altering the configuration of the magnetizing source 60.

After the chip and the magnetized beam lead assembly is separated from the carrier 50, the chip may be placed on the substrate 12 and aligned in accordance with the process described in the aforementioned copending application Ser. No. 320,233. A uniform magnetic field $\beta$, represented by the dashed lines 38, see FIGS. 3 and 4, is applied normal to the plane of the substrate 12 and the plane of the horizontally disposed lead 20. The cantilevered end 30 of the lead 20 is bent toward the substrate by a force F produced by the interaction of $\beta$ and $+ Q_m$, forcing the lead end 30 to contact the circuit run 14. The force F, which is proportioned to $Q_m$ and $\beta$ must be sufficient to overcome the force due to the inherent stiffness of the lead 20. The magnetic field H must not distrub the favorable magnetic history of the lead 20, prior to the time a preferred direction of deflection is established. Noting FIGS. 2 and 3, it is apparent that the assembly is not susceptible to edge shorting, i.e., shorting of the deflected lead (20' FIG. 3) to the body of the chip 16. For a detailed consideration of edge shorting, reference is made to my co-pending application Ser. No. 331,163 assigned to the same assignee as the present invention. It is further evident from FIGS. 2 and 3 that the thickness of the individual circuit runs 14 may vary considerably within the range established by the thickness of the chip 16 and bonding pads 22. My invention therefore permits variations in surface topology of the leads 14 heretofore not achievable with rigid beam-lead or flip-chip devices.

A heater 80 (FIG. 4) is provided to raise the temperature of the bonding medium 36 (FIG. 3) above its melting point thus reflow bonding the lead end 30 to the circuit run 14. The sequence of operations for effecting the outer-lead bond by solder reflow may be varied, e.g., the temperature of the bonding medium 36 may be raised to the melting point prior to deflecting the leads, and the electromagnet 44 then momentarily energized. The deflected lead may be captured and held (without further force from the electromagnet 44) by the surface tension of the liquid bonding medium 36. Alternatively, the electromagnet 44 may be deenergized after the bonding medium 36 has been allowed to solidify if the surface tension is not sufficient to capture and hold the deflected lead 20'.

Soft magnetic materials may also be utilized to form the leads 20. Examples of relatively soft alloys which may be utilized are nickel, 49 Ni balance Fe, 28 Ni 17 Co balance Fe, and the like. In order to insure deflection of the leads 20 in the proper direction, the leads 20 may be slightly postformed as illustrated by the position of the lead 20-1 in FIG. 4. The postforming of leads formed from the so-called soft magnetic alloys is not, however, a requirement for the practice of my invention. Magnetic alloys, both high-permeability and permanent magnetic alloys, undergo thermal heat treatments or processes to achieve their designated optimum magnetic parameters. Each given alloy is capable of exhibiting a variety of magnetic properties as a result of heat treating and manufacturing processes. The so-called soft alloys may, therefore, exhibit significant remanence, i.e., sufficient to establish a preferred direction of deflection of the leads as previously described.

Figure 10:
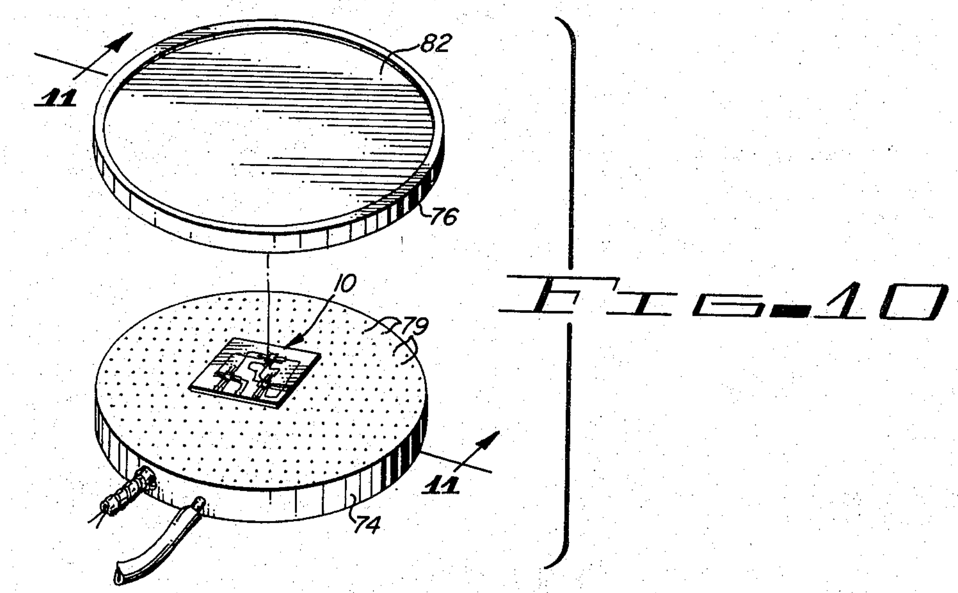
FIG. 10 is an isometric view of a fixture for postforming the leads.
Figure 11:
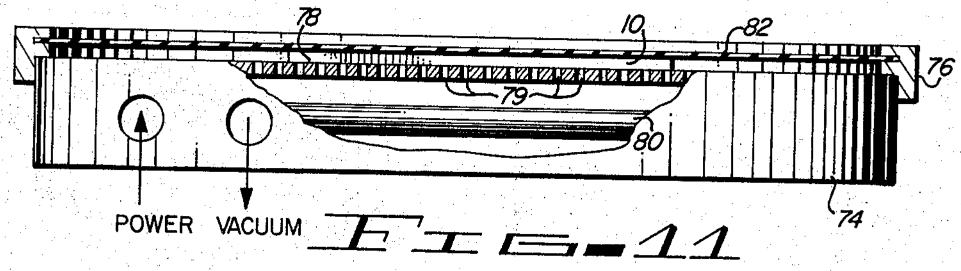
FIG. 11 is a section view of the fixture of FIG. 10.

Referring now to FIGS. 10 and 11, the postforming may be accomplished by placing the assembly 10 in a fixture comprising a base 74 and a cover 76. The base 74 includes a support member 78 having perforations 79 therein. A heater element 80 in the base 74 provides a means for heating the assembly 10 during reflow bonding operations. The cover 76 includes an elastic membrane 82, for example, rubber, which bears upon the assembly 10 when a differential pressure is generated by evacuating the covered fixture (FIG. 11).

Figure 12:
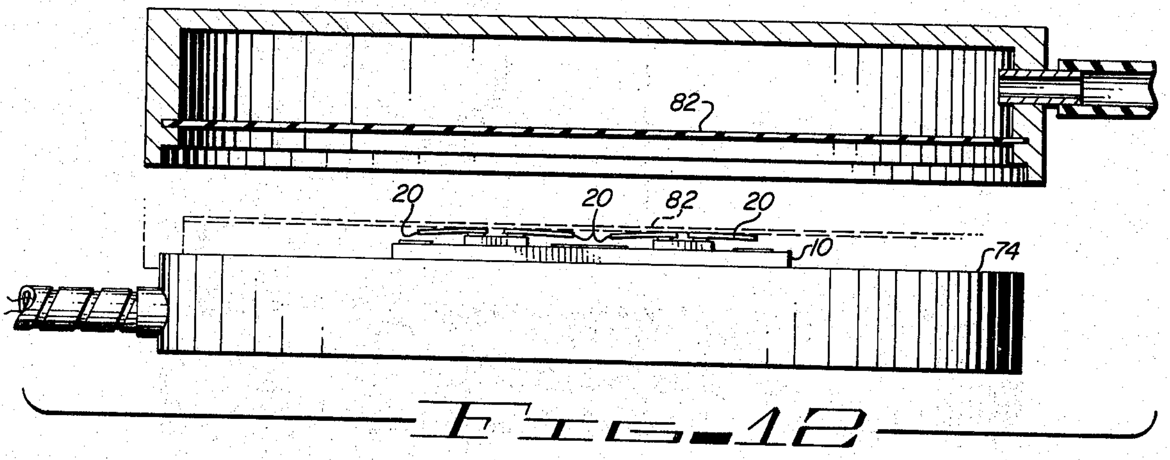
FIG. 12 is another embodiment of the fixture of FIG. 10.

FIG. 12 shows an alternate embodiment of the fixture wherein the differential pressure forcing the membrane 82 to bear against the leads 20 is generated by introducing gas under pressure into the cover 76 to slightly preform the leads 20, thereby establishing a preferential direction of deflection for the subsequent magnetic deflection operation. The cover 76 may remain on the base 74 during the lead deflection step in order to ensure deflection in the proper direction, however, a slight initial post-forming without additional cooperative force from the membrane 82 has been found sufficient to establish a directional preference for magnetic deflection of leads 20 of soft ferromagnetic metal. When a rubber membrane 82 is utilized, the cover 76 must be removed from the base 74 prior to the heating operation in order to prevent damaging the membrane 82. The heater 80 need not be an integral part of the fixtures of FIGS. 10 and 11, but may be separate as shown in FIG. 4, since it is advantageous to minimize the distance of the gap between the poles 40, 41 of the electromagnet 44.

While the principles of my invention have been made clear in the foregoing description, it will be immediately obvious to those skilled in the art that many modifications of the structure, arrangement, proportion, the elements, material and components may be used in the practice of the invention which are particularly adapted for specific environments without department from those principles. The appended claims are intended to cover and embrace any such modifications within the limits only of the true spirit and scope of my invention.

What is claimed is:

1. A method for assembling microelectronic apparatus of the type including a planiform insulator with a conductive run formed on a surface thereof, and a circuit device having one end of an elongated lead of ferromagnetic material affixed to an active face of the device, the other end of the lead extending in cantilevered fashion from the device, the device attached face up to the surface of the planiform insulator, the cantilevered end of the lead aligned over the conductive run, the method comprising the steps of:

magnetically deflecting the cantilevered portion of the lead toward the conductive run to establish mechanical contact therewith, and bonding the deflected lead portion to the conductive run.

2. A method for assembling microelectronic apparatus, comprising the steps of:

magnetizing a flexible elongated lead of ferromagnetic material;

affixing one end of the magnetized lead to an active face of a circuit chip, another end of the lead extending in cantilevered fashion from the chip;
affixing the chip, face up, to a surface of a substrate, the cantilevered end of the lead aligned with an electrical circuit on the surface;
magnetically deflecting the cantilevered end of the lead toward the electrical circuit to establish mechanical contact therewith; and
bonding the deflected lead end to the circuit.

3. A method for assembling microelectronic apparatus, comprising the steps of:
affixing an end of an elongated flexible lead of ferromagnetic material to an active face of a circuit device, another end of the lead extending in cantilevered fashion from the device;
affixing the face opposite the active face of the circuit device to a surface of a substrate, the cantilevered end of the lead aligned over an electrical circuit formed on the surface of the substrate;
magnetizing the lead;
magnetically deflecting the cantilevered end of the lead toward the electrical circuit to establish mechanical contact therewith; and
bonding the deflected lead to the circuit.

4. A method for assembling microelectronic appatatus, comprising the steps of:
affixing an end of an elongated flexible lead of ferromagnetic material to an active face of a circuit device, another end of the lead extending in cantilevered fashion from the device;
bonding the face opposite the active face of the circuit device to a surface of a substrate, the cantilevered end of the lead aligned over an electrical circuit formed on the surface of the substrate;
magnetically deflecting the cantilevered lead end toward the electrical circuit to establish mechanical contact therewith; and
bonding the deflected lead end to the circuit.

5. The method according to claim 4 further including the step of coating the electrical circuit with a solder; and wherein the bonding step includes the steps of heating the assembly comprising the substrate and the circuit chip affixed thereto until reflow of the solder occurs, cooling the assembly to solidify the solder, and removing the magnetic field utilized to deflect the lead end.

6. The method according to claim 4 further including prior to the deflecting step, the steps of coating the electrical circuit with a solder, and heating the solder until molten; wherein the deflecting step further includes the step of removing the deflecting magnetic field when the deflected lead end is captured by the molten solder; and wherein the bonding step includes the step of cooling the molten solder until solid.

7. The method according to claim 4 further including prior to the deflecting step, the step of postforming the lead to establish a preferential direction of deflection.

8. The method according to claim 4 wherein the deflecting step includes the step of magnetizing the lead sufficiently to establish a preferential direction of deflection.

9. A method for assembling microelectronic apparatus, comprising the steps of:
affixing an end of an elongated flexible lead of soft ferromagnetic material to an active face of a circuit device, another end of the lead extending in cantilevered fashion from the device;
affixing the face opposite the active face of the circuit device to a surface of a substrate, the cantilevered end of the lead aligned over an electrical circuit formed on the surface of the substrate;
postforming the lead by mechanically flexing the lead toward the electrical circuit sufficiently to establish a preferential direction for magnetic deflection;
magnetically deflecting the postformed lead further toward the electrical circuit to establish mechanical contact therewith; and
bonding the deflected lead to the circuit.

10. A method for assembling microelectronic apparatus, comprising the steps of:
affixing one end of each of a plurality of elongated leads of ferromagnetic material to an active face of a circuit chip, the other ends of the leads extending from the active face in cantilevered fashion;
affixing a plurality of the leaded chips face up to a surface of a substrate, the substrate having electrical circuit runs formed on the surface, each of the cantilevered ends of the plurality of leads aligned over a corresponding one of the circuit runs;
simultaneously magnetically deflecting the cantilevered lead ends toward the surface of the substrate to establish mechanical contact between the cantilevered lead ends and the corresponding circuit runs; and
simultaneously bonding the cantilevered lead ends to the corresponding circuit runs.

11. The method according to claim 10 wherein the bonding step includes the steps of:
heating the assembly comprising the substrate and the leaded chips until a solder coating on the circuit runs reflows; and
cooling the assembly to solidify the solder.

12. The method according to claim 10 wherein the deflecting step includes the step of magnetizing the plurality of leads to establish a preferential direction for deflecting the leads.

* * * * *